US007764980B2

(12) United States Patent
Yoo

(10) Patent No.: US 7,764,980 B2
(45) Date of Patent: Jul. 27, 2010

(54) MOBILE COMMUNICATION TERMINAL FOR REMOVING NOISE IN TRANSMITTING SIGNAL AND METHOD THEREOF

(75) Inventor: Jee Yong Yoo, Seoul (KR)

(73) Assignee: Samsung Electronics Co., Ltd (KR)

( * ) Notice: Subject to any disclaimer, the term of this patent is extended or adjusted under 35 U.S.C. 154(b) by 493 days.

(21) Appl. No.: 11/851,943

(22) Filed: Sep. 7, 2007

(65) Prior Publication Data

US 2008/0064336 A1 Mar. 13, 2008

(30) Foreign Application Priority Data

Sep. 12, 2006 (KR) ...................... 10-2006-0087895

(51) Int. Cl.
*H04B 1/38* (2006.01)
*H04B 15/00* (2006.01)

(52) U.S. Cl. .................. 455/570; 455/114.2; 455/63.1; 455/67.13; 381/94.1

(58) Field of Classification Search ................. 455/501, 455/63.1, 67.13, 570, 114.2, 296; 381/71.1, 381/94.1; 379/392.01
See application file for complete search history.

(56) References Cited

U.S. PATENT DOCUMENTS 6,108,415 A * 8/2000 Andrea .................. 379/433.03
6,192,255 B1 * 2/2001 Lewis et al. ................. 455/558
6,751,446 B1 * 6/2004 Kim et al. .................. 455/90.1
7,359,504 B1 * 4/2008 Reuss et al. ............ 379/406.02
7,464,029 B2 * 12/2008 Visser et al. ................ 704/210
2007/0253561 A1 * 11/2007 Williams et al. .............. 381/58
2007/0274552 A1 * 11/2007 Konchitsky et al. ......... 381/328

FOREIGN PATENT DOCUMENTS

JP 03132241 * 6/1991
JP 09284374 * 10/1997

* cited by examiner

*Primary Examiner*—Duc M Nguyen
(74) *Attorney, Agent, or Firm*—The Farrell Law Firm, LLP

(57) ABSTRACT

A mobile communication terminal for removing noise in a transmitting signal and a method thereof are provided. The mobile communication terminal includes a first microphone for capturing a voice signal to be transmitted a second microphone attached to a position different from the first microphone to capture sound signals, an amplifier for amplifying the sound signals of the second microphone, a codec for separately converting the amplified sound signals of the second microphone and the voice signal of the first microphone to digital sound data, and a controller for analyzing the converted digital sound data and controlling a gain of the first microphone if a repeated pattern is detected in either of the separated digital sound data. Herein, noise generated in sound signals for transmission in a phone call is removed by using two microphones.

20 Claims, 5 Drawing Sheets

MOBILE COMMUNICATION TERMINAL FOR REMOVING NOISE IN TRANSMITTING SIGNAL AND METHOD THEREOF

CLAIMS OF PRIORITY

This application claims priority to an application entitled "MOBILE COMMUNICATION TERMINAL FOR REMOVING NOISE IN TRANSMITTING SIGNAL AND METHOD THEREOF" filed in the Korean Intellectual Property Office on Sep. 12, 2006 and assigned Serial No. 2006-87895, the contents of which are incorporated herein by reference.

BACKGROUND OF THE INVENTION

1. Field of the Invention

The present invention relates generally to a mobile communication terminal for removing noise in a transmitting signal and a method thereof, and more particularly, to a mobile communication terminal for removing noise in a transmitting signal by using two microphones for capturing sound signals.

2. Description of the Related Art

Recently, due to the proliferation of mobile communication terminals, home telephone usage been increasingly replaced by mobile communication terminals for phone call placement.

However, because a mobile communication terminal communicates even while moving, there is a problem in that communication is not satisfactorily performed due to transmission of both voice data to be transferred to another party and noise generated from the outside of the terminal. Further, when surrounding noise has a sound level higher than a voice to be transferred to another party, satisfactory communication may be impossible.

Accordingly, a first technology for removing white noise by dividing input Pulse-Code Modulation (PCM) data into a bit unit and comparing bit values was developed. Also developed was a second technology of determining whether a level of an input reception voice signal exists within a preset reference level and adjusting and outputting a gain according to the level of the voice signal.

However, because the first technology is for removing white noise generated inside of the mobile communication terminal, a problem occurs in that noise generated outside of the terminal cannot be removed. Further, in the second technology, because the volume change according to a section of a voice signal is artificially performed, a problem occurs in that sound quality deteriorates.

SUMMARY OF THE INVENTION

The present invention has been made in an effort to solve the above problems, and an object of the present invention is to provide a mobile communication terminal for removing noise in a transmitting signal and a method thereof that can remove noise by using a dual microphone in a mobile communication terminal.

Another object is to provide a mobile communication terminal for removing noise in a transmitting signal and a method thereof that can compare both sound signals captured by a dual microphone and recognize and transmit a voice signal having an identical sound pattern in both of the sound signals.

Another object is to provide a mobile communication terminal for removing noise in a transmitting signal and a method thereof that can analyze both sound signals captured by a dual microphone and recognize a repeated pattern as a noise from each sound signal, and remove the recognized noise.

Another object is to provide a mobile communication terminal for removing noise in a transmitting signal and a method thereof that can minimize deterioration of sound quality by coupling both sound signals captured by a dual microphone.

In accordance with the present invention, a mobile communication terminal for removing noise in a transmitting signal includes a first microphone for capturing a voice signal to be transmitted, a second microphone attached to a position different from the first microphone for capturing sound signals, an amplifier for amplifying the sound signals of the second microphone, a codec for separately converting the amplified sound signals of the second microphone and the voice signal of the first microphone to digital sound data, and a controller for analyzing the converted digital sound data and controlling a gain of the first microphone if a repeated pattern is detected in either of the separated digital sound data.

In accordance with the present invention, a method of removing noise in a transmitting signal includes capturing a voice signal by a first microphone and capturing sound signals by a second microphone, amplifying the sound signals captured by the second microphone, converting separately the amplified sound signals and the voice signal captured by the first microphone, to digital sound data, analyzing whether a repeated pattern exists in either of the separated digital sound data, and reducing, if a repeated pattern exists in either of the separated digital sound data, a gain of the first microphone.

In accordance with the present invention, a mobile communication terminal for removing noise in a transmitting signal includes a first microphone for capturing a voice signal to be transmitted, a second microphone attached to a position different from the first microphone to capture sound signals, an amplifier for capturing and amplifying the sound signals of the second microphone, a codec for separately converting the amplified sound signals of the second microphone and the voice signal of the first microphone to digital sound data, and a controller for comparing both of the converted digital sound data, determining whether an identical pattern exists in both of the digital sound data, and extracting and coupling the digital sound data having the identical pattern.

In accordance with the present invention, a method of removing noise in a transmitting signal includes capturing a voice signal by a first microphone and sound signals by a second microphone, converting separately the voice signal captured by the first microphone and sound signals by the second microphone to digital sound data, determining whether an identical pattern exists in both of the digital sound data, extracting, if an identical pattern exists in both of the digital sound data, the digital sound data having the identical pattern from each of the digital sound data; and coupling the extracted digital sound data having the identical pattern.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE PREFERRED EMBODIMENTS

Preferred embodiments of the present invention are described with reference to the accompanying drawings in detail. The same reference numbers are used throughout the drawings to refer to the same or like parts. Detailed descriptions of well-known functions and structures incorporated herein may be omitted for the sake of clarity and conciseness.

While the present invention may be embodied in many different forms, specific embodiments of the present invention are shown in drawings and are described herein in detail, with the understanding that the present disclosure is to be considered as a description of the principles of the invention and is not intended to limit the invention to the specific embodiments illustrated.

In a preferred embodiment of the present invention, a mobile communication terminal is described. However, the present invention can also be applied to other information communication appliances and multimedia appliances such as a mobile terminal having a communication function, a mobile phone, a Personal Digital Assistant (PDA), a smart phone, a computer that can use an Internet telephone by using VoIP, and applications thereof.

In the following description, a “sound signal” includes both a voice signal to be transmitted and sound signals such as noise. Further, “sound data” indicates digital data into which a voice signal to be transmitted and sound signals such as noise are converted.

Figure 1:
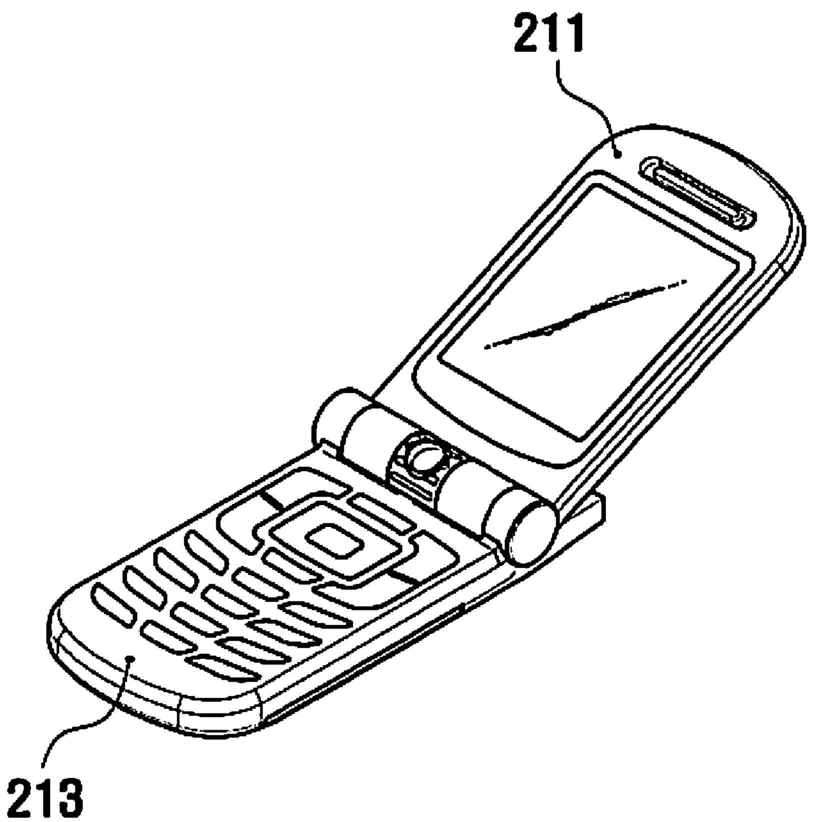
FIG. 1 illustrates a mobile communication terminal for removing noise in a transmitting signal according to the present invention.

FIG. 1 illustrates a mobile communication terminal for removing noise in a transmitting signal according to the present invention.

Referring to FIG. 1, the mobile communication terminal has a first microphone 213 and a second microphone 211. The first microphone 213 is generally mounted in the mobile communication terminal, and the second microphone 211 is mounted in a position different from the first microphone 213 to improve accuracy in removing noise.

Figure 2:
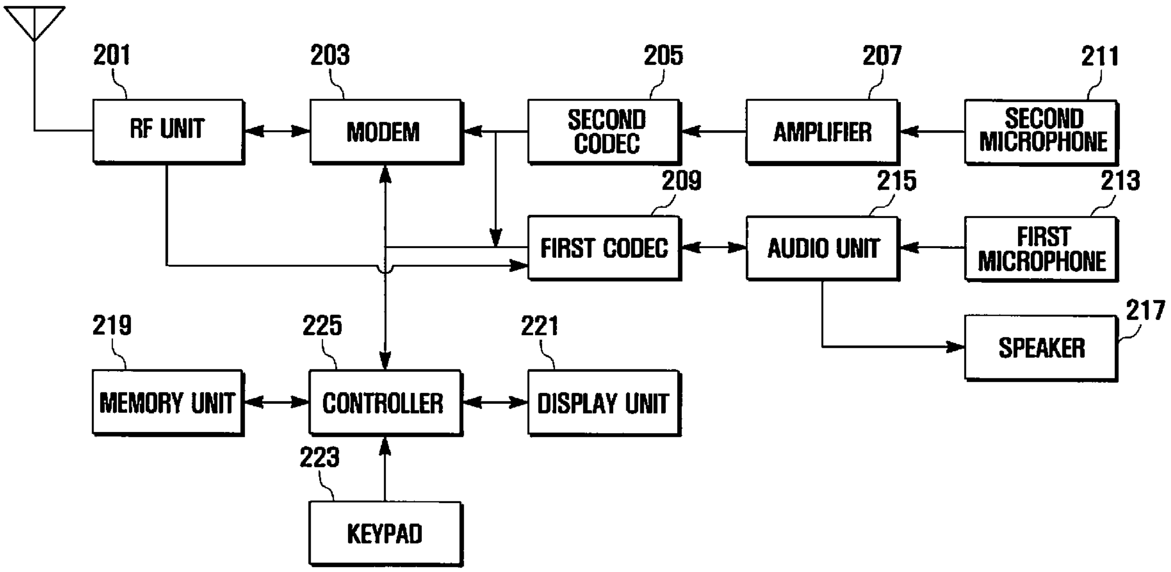
FIG. 2 illustrates a configuration of a mobile communication terminal for removing noise in a transmitting signal according to the present invention.

FIG. 2 illustrates a configuration of a mobile communication terminal for removing noise in a transmitting signal according to the present invention.

Referring to FIG. 2, the mobile communication terminal includes a Radio Frequency (RF) unit 201, a modem 203, a second codec 205, an amplifier 207, a first codec 209, a second microphone 211, a first microphone 213, an audio unit 215, a speaker 217, a memory unit 219, a display unit 221, a keypad 223 and a controller 225.

The RF unit 201 performs normal wireless communication between the mobile communication terminal and a mobile communication network. For example, the RF unit 201 performs transmission/reception of voice data, transmission/reception of a character message and transmission/reception of a multimedia message through the mobile communication network.

The modem 203 modulates a signal to be transmitted by the RF unit 201 and demodulates a signal received by the RF unit 201.

The amplifier 207 amplifies sound signals captured by the second microphone 211.

The second codec 205 converts a voice signal to be transmitted and the sound signals such as noise captured by the second microphone 211 to digital sound data.

The first codec 209 encodes the signal to be transmitted by the RF unit 201 and decodes the signal received by the RF unit 201. Particularly, the first codec 209 converts the voice signal to be transmitted captured by the first microphone 213 to digital sound data.

The second microphone 211 is attached to a position different from the first microphone 213 to capture the voice signal to be transmitted and the sound signals such as noise.

The first microphone 213 captures the voice signal to be transmitted.

The audio unit 215 converts an analog audio signal input through the first microphone 213 to a digital audio signal and reproduces the digital audio signal output from the first codec 209 through a speaker 217.

The speaker 217 outputs the digital audio signal received from the audio unit 215.

The memory unit 219 stores information (for example, information about setting state and menus) related to operations of the mobile communication terminal by the control of the controller 225.

The display unit 221 displays operation states performed in the mobile communication terminal, operation results, and a plurality of information by the control of the controller 225. The display unit 221 includes a display device such as a Liquid Crystal Display (LCD), an Organic Light Emitting Diode (OLED), and a Plasma Display Panel (PDP).

The keypad 223 includes a normal key input device such as a touch screen, a touch pad or a scroll wheel. The keypad 223 receives a manipulation signal input by a user for controlling operation of the mobile communication terminal and provides the signal to the controller 225.

The controller 225 controls the entire mobile communication terminal operation. For example, the controller 225 analyzes digital sound data converted by the first codec 209 and the second codec 205 and determines whether a continuously repeated pattern exists for a predetermined time in the sound data. The controller 225 controls a gain of the first microphone 213 according to the determination result. The controller 225 removes noise by recognizing a continuously repeated pattern for a predetermined time as noise and lowering the gain of the first microphone 213. The controller 225 couples signals captured by the first microphone 213 and the second microphone 211:

Further, the controller 225 compares the digital sound data converted by the first codec 209 and by the second codec 205, determines whether an identical pattern exists in both of the digital sound data, and extracts and couples only digital sound data having the identical pattern. An identical pattern in both of the digital sound data is recognized as a voice signal to be transmitted and the remaining sound signals are recognized as noise. Noise is removed by removing the sound signals recognized as noise.

Figure 3:
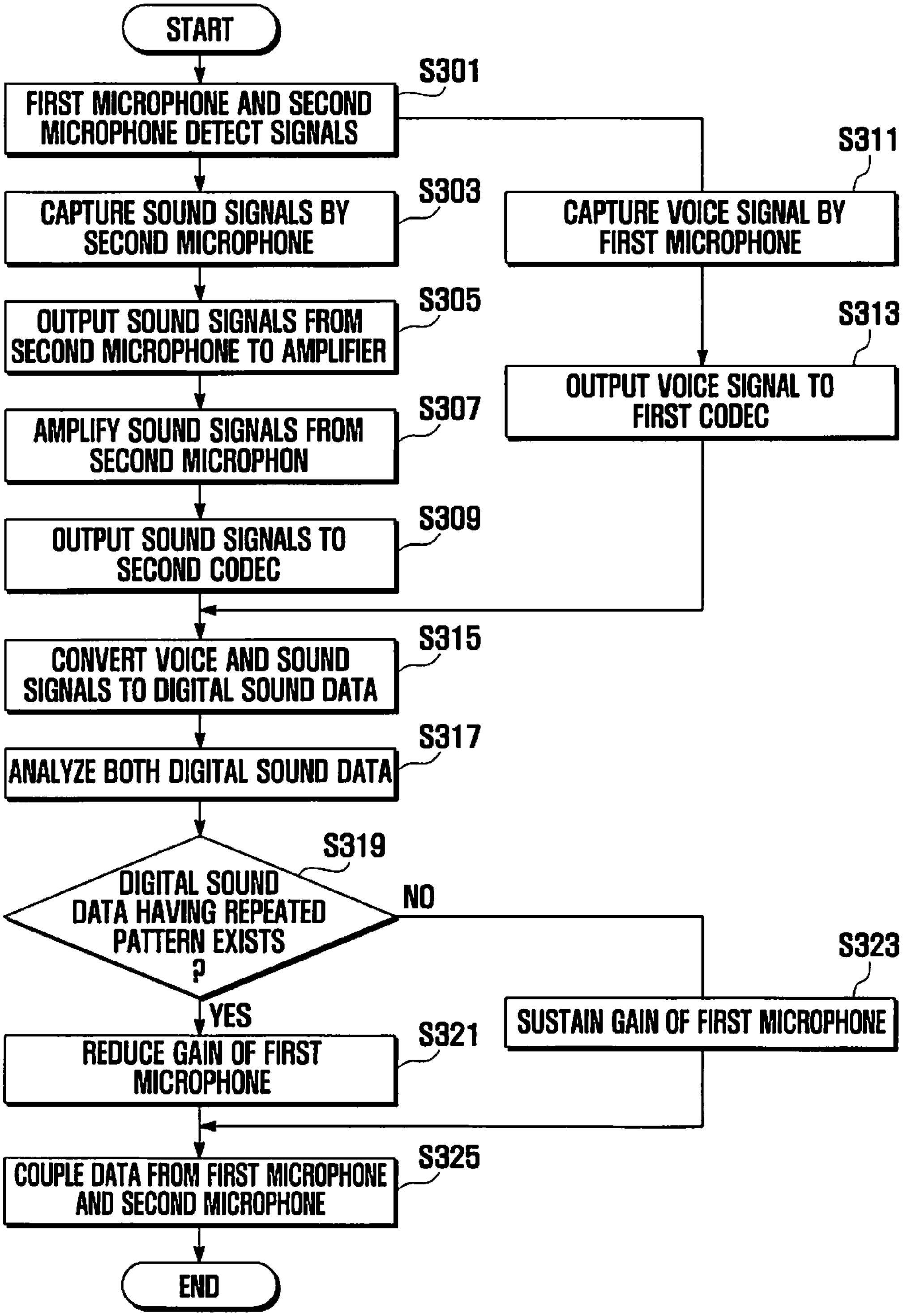
FIG. 3 illustrates a method of removing noise in a transmitting signal according to the present invention.

FIG. 3 illustrates a method of removing noise in a transmitting signal according to the present invention.

Steps S301 to S315 are performed in the first microphone 213, the second microphone 211, the amplifier 207, the first codec 209, and the second codec 205, and steps S317 to S325 are performed in the controller 225. However, for convenience of description, the method is described with one flow.

Referring to FIG. 3, the first microphone 213 and the second microphone 211 detect signals (S301), the second microphone 211 captures sound signals (S303) and the first microphone 213 captures a voice signal to be transmitted (S311). The sound signals include a voice signal to be transmitted, surrounding noise, and noise generated in hardware. When the second microphone 211 captures the sound signals (S303), the second microphone 211 outputs the captured sound signals to the amplifier 207 (S305). Thereafter, the amplifier 207 amplifies the received sound signals (S307) and outputs the amplified sound signals to the second codec 205 (S309). Meanwhile, the first microphone 213 outputs the captured voice signal to the first codec 209 (S313).

The voice signal and the sound signals received by the first codec 209 and the second codec 205 respectively are converted to digital sound data by the first codec 209 and the second codec 205 (S315), and the digital sound data is transmitted to the controller 225. The controller 225 analyzes the converted digital sound data (S317). The controller 225 determines whether digital sound data of a continuously repeated pattern exists for a predetermined time in either of the analyzed digital sound data (S319) and reduces, if digital sound data of a continuously repeated pattern exists in either of the digital sound data, a gain of the first microphone 213 (S321). The controller 225 recognizes digital sound data of a repeated pattern as noise. If digital sound data of a repeated pattern does not exist at step S319, the gain of the first microphone 213 is sustained (S323). Thereafter, the controller 225 couples and transmits the digital sound data of the first microphone 213 and the second microphone 211 (S325).

Figure 4:
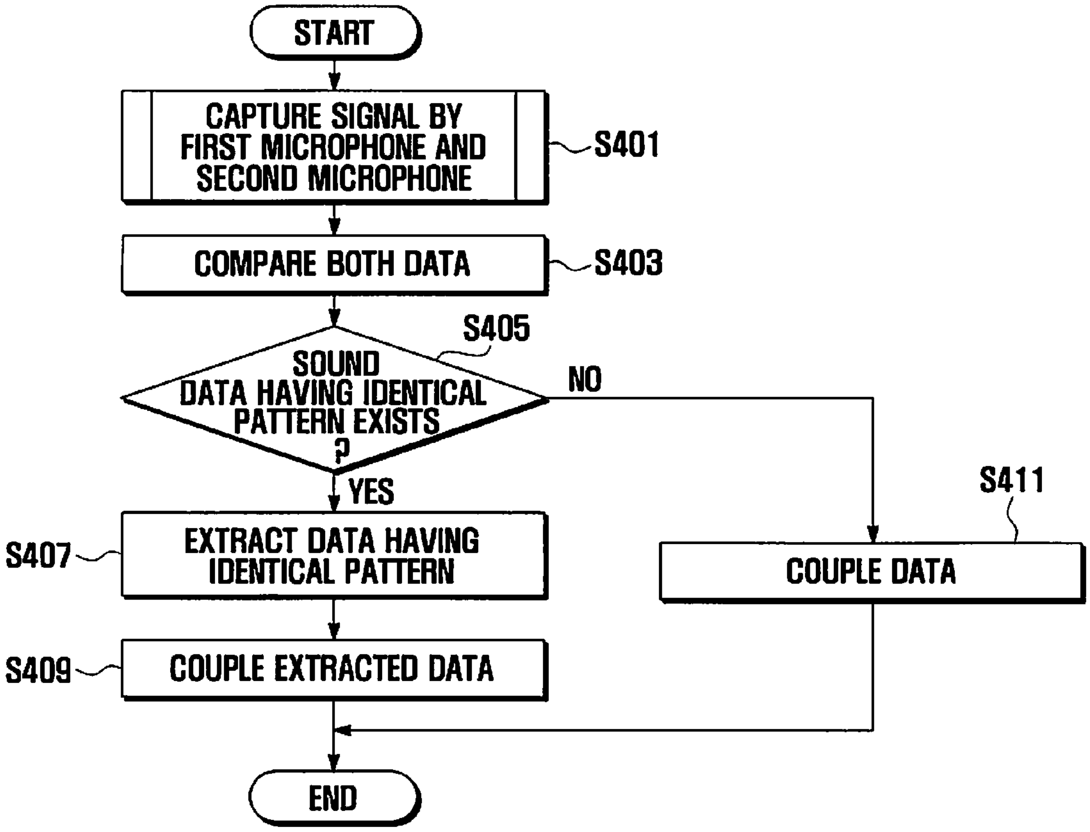
FIG. 4 illustrates a method of removing noise in a transmitting signal according to the present invention.

FIG. 4 illustrates a method of removing noise in a transmitting signal according to the present invention.

Step S401 is performed in the first microphone 213, the second microphone 211, the amplifier 207, the first codec 209, and the second codec 205, and steps S403 to S411 are performed in the controller 225. However, for convenience of description, the method is described with one flow.

Referring to FIG. 4, the first microphone 213 captures a voice signal and the second microphone 211 captures sound signals, and the first codec 209 and the second codec 205 convert the voice signal and the sound signals, respectively, to digital sound data (S401). Then the controller 225 compares both of the digital sound data (S403). If digital sound data having an identical pattern exists in both of the compared digital sound data (S405), the controller 225 extracts the digital sound data having the identical pattern (S407) and couples the extracted digital sound data (S409). The controller 225 recognizes digital sound data having an identical pattern as a voice signal to be transmitted and recognizes digital sound data having a non-identical pattern as noise. If digital sound data having an identical pattern do not exist at step S405, the controller 225 couples and transmits the digital sound data captured by the first microphone 213 and the second microphone 211 (S411).

Figure 5:
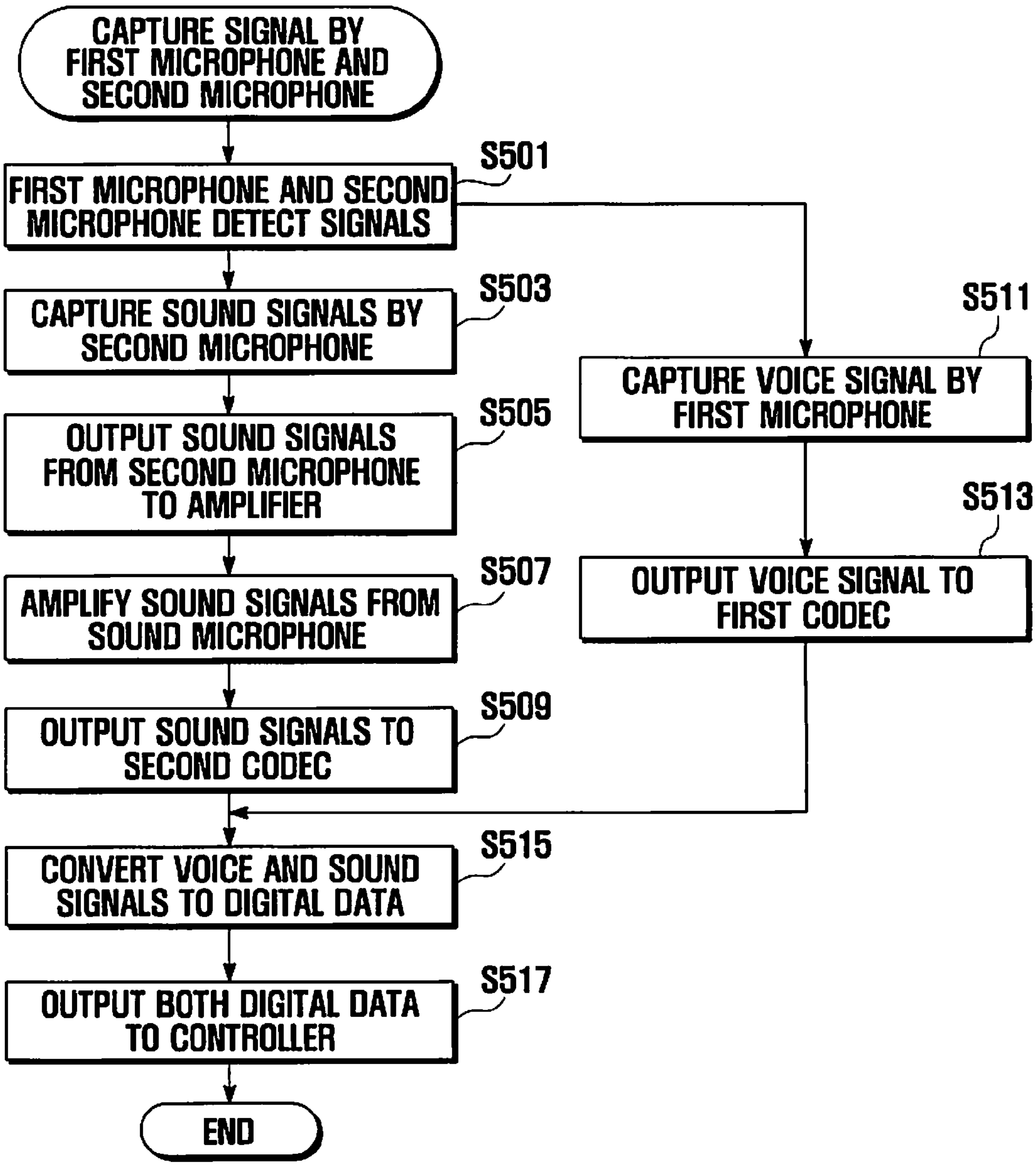
FIG. 5 illustrates a procedure for processing a signal captured by a microphone according to the method of FIG. 4.

FIG. 5 illustrates a procedure for processing a signal captured by a microphone (step S401 in FIG. 4) according to the method of FIG. 4. Steps of FIG. 5 are performed in the first microphone 213, the second microphone 211, the amplifier 207, the first codec 209 and the second codec 205. However, for convenience of description, the method is described with one flow.

Referring to FIG. 5, the first microphone 213 and the second microphone 211 detect signals (S501), the second microphone 211 captures sound signals (S503) and the first microphone 213 captures a voice signal to be transmitted (S511). The sound signals include a voice signal, surrounding noise and noise generated in a hardware. When the second microphone 311 captures the sound signals (S503), the second microphone 311 outputs the captured sound signals to the amplifier 207 (S505). Thereafter, the amplifier 207 amplifies the received sound signals (S507) and outputs the amplified sound signals to the second codec 205 (S509). Meanwhile, the first microphone 213 outputs the received voice signal to the first codec 209 (S513).

The voice signal and sound signals received by the first codec 209 and the second codec 205 respectively are converted to digital sound data by the first codec 209 and the second codec 205 (S515), and the digital sound data is output to the controller 225 (S517). Thereafter, step S403 of FIG. 4 is performed in the controller 225.

As described above, according to the present invention, noise is removed by using a dual microphone.

Noise is removed by comparing both of the sound signals captured by the dual microphone and transmitting only those having an identical voice pattern.

Noise is also removed by analyzing the sound signals captured by the dual microphone, recognizing a repeated pattern as noise, and reducing a gain of the microphone.

Further, deterioration of sound quality is minimized by removing noise from the sound signals captured by the dual microphone and then coupling the sound signals.

Although preferred embodiments of the present invention have been described in detail hereinabove, it should be clearly understood that many variations and modifications of the basic inventive concepts herein taught that may appear to those skilled in the present art will still fall within the spirit and scope of the present invention, as defined in the appended claims.

What is claimed is:

1. A mobile communication terminal for removing noise in a transmitting signal, comprising:

a first microphone for capturing a voice signal to be transmitted;

a second microphone attached to a position different from the first microphone for capturing sound signals;

an amplifier for amplifying the sound signals of the second microphone;

a codec for separately converting the amplified sound signals of the second microphone and the voice signal of the first microphone to digital sound data; and a controller for analyzing the converted digital sound data and controlling a gain of the first microphone if a repeated pattern is detected in either of the separated digital sound data.

2. The mobile communication terminal of claim 1, wherein the codec comprises:

a first codec for converting the voice signal of the first microphone to digital sound data; and a second codec for converting the amplified sound signals of the second microphone to digital sound data.

3. The mobile communication terminal of claim 1, wherein the controller analyzes the converted digital sound data and determines whether a repeated pattern exists in either of the converted digital sound data.

4. The mobile communication terminal of claim 3, wherein the controller reduces, if a repeated pattern exists in either of the converted digital sound data, the gain of the first microphone.

5. The mobile communication terminal of claim 3, wherein the controller sustains, if a repeated pattern does not exist in either of the converted digital sound data, the gain of the first microphone.

6. The mobile communication terminal of claim 4, wherein the controller couples the digital sound data of the first microphone in which the gain is controlled and the digital sound data of the second microphone.

7. The mobile communication terminal of claim 5, wherein the controller couples the digital sound data of the first microphone in which the gain is controlled and the digital sound data of the second microphone.

8. A method of removing noise in a transmitting signal, comprising:
- capturing a voice signal by a first microphone and capturing sound signals by a second microphone;
- amplifying the sound signals captured by the second microphone;
- converting separately the amplified sound signals, and the voice signal captured by the first microphone, to digital sound data;
- analyzing whether a repeated pattern exists in either of the separated digital sound data; and
- reducing, if a repeated pattern exists in either of the separated digital sound data, the gain of the first microphone.

9. The method of claim 8, further comprising sustaining, if a repeated pattern does not exist in either of the separated digital sound data, the gain of the first microphone.

10. The method of claim 8, further comprising coupling the digital sound data of the first microphone in which the gain is controlled and the digital sound data of the second microphone.

11. The method of claim 9, further comprising coupling the digital sound data of the first microphone in which the gain is controlled and the digital sound data of the second microphone.

12. A mobile communication terminal for removing noise in a transmitting signal, comprising:
- a first microphone for capturing a voice signal to be transmitted;
- a second microphone attached to a position different from the first microphone to capture sound signals;
- an amplifier for capturing and amplifying the sound signals of the second microphone;
- a codec for separately converting the amplified sound signals of the second microphone and the voice signal of the first microphone to digital sound data; and
- a controller for comparing both of the converted digital sound data, determining whether an identical pattern exists in both of the digital sound data, and extracting and coupling the digital sound data having the identical pattern.

13. The mobile communication terminal of claim 12, wherein the codec comprises:
- a first codec for converting the voice signal of the first microphone to digital sound data; and
- a second codec for converting the amplified sound signals of the second microphone to digital sound data.

14. The mobile communication terminal of claim 12, wherein the controller compares both of the converted digital sound data and determines whether an identical pattern exists in both of the converted digital sound data.

15. The mobile communication terminal of claim 14, wherein the controller extracts and couples, if an identical pattern exists in both of the converted digital sound data, the digital sound data having the identical pattern.

16. The mobile communication terminal of claim 14, wherein the controller couples, if an identical pattern does not exist in both of the converted digital sound data, the converted digital sound data.

17. A method of removing noise in a transmitting signal, comprising:
- capturing a voice signal by a first microphone and sound signals by a second microphone;
- converting separately the voice signal captured by the first microphone and the sound signals captured by the second microphone to digital sound data;
- determining whether an identical pattern exists in both of digital sound data;
- extracting, if an identical pattern exists in both of the digital sound data, the digital sound data having the identical pattern from each of digital sound data; and
- coupling the extracted digital sound data having the identical pattern.

18. The method of claim 17, further comprising amplifying sound signals captured by the second microphone.

19. The method of claim 17, further comprising comparing both of the digital sound data to determine whether an identical pattern exists in both of the digital sound data.

20. The method of claim 17, further comprising coupling, if an identical pattern does not exist both of the digital sound data, the digital sound data.

* * * * *